(12) United States Patent
Reissmueller et al.

(10) Patent No.: US 11,550,805 B2
(45) Date of Patent: Jan. 10, 2023

(54) COMPACT DISPLAY OF MATCHING RESULTS

(71) Applicant: SAP SE, Walldorf (DE)

(72) Inventors: Christian Reissmueller, Walldorf (DE); Vladimir Shapiro, Sinsheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/098,593

(22) Filed: Nov. 16, 2020

(65) Prior Publication Data

US 2022/0156253 A1   May 19, 2022

(51) Int. Cl.
| | |
|---|---|
| *G06F 3/048* | (2013.01) |
| *G06F 16/248* | (2019.01) |
| *G06F 3/0481* | (2022.01) |
| *G06F 3/04847* | (2022.01) |
| *G06F 9/451* | (2018.01) |

(52) U.S. Cl.
CPC .......... *G06F 16/248* (2019.01); *G06F 3/0481* (2013.01); *G06F 3/04847* (2013.01); *G06F 9/451* (2018.02)

(58) Field of Classification Search
CPC ...... G06F 16/248; G06F 9/451; G06F 3/0481; G06F 3/04847
See application file for complete search history.

(56) References Cited

U.S. PATENT DOCUMENTS

| | | | | |
|---|---|---|---|---|
| 7,921,379 B1 * | 4/2011 | Ko | ........................ | G06F 16/954 715/834 |
| 9,852,470 B1 * | 12/2017 | Kunz | .................... | G06F 3/0486 |
| 10,523,523 B2 * | 12/2019 | Shurtleff | ............. | H04L 41/0853 |
| 2007/0226640 A1 * | 9/2007 | Holbrook | .............. | G06F 16/951 715/765 |
| 2011/0125765 A1 * | 5/2011 | Tuli | ...................... | G06F 16/437 707/E17.014 |
| 2016/0110432 A1 * | 4/2016 | Mun | ....................... | G06F 16/54 715/783 |
| 2017/0351386 A1 * | 12/2017 | Shurtleff | ............... | G06F 16/248 |
| 2018/0004644 A1 * | 1/2018 | Conti | .................. | G06F 11/3668 |
| 2018/0033203 A1 * | 2/2018 | Ligameri | .............. | G06F 3/1454 |
| 2019/0012367 A1 * | 1/2019 | Bari | ....................... | G06F 17/18 |
| 2019/0089193 A1 * | 3/2019 | Ranjan | ................... | G05B 15/02 |
| 2019/0303371 A1 * | 10/2019 | Rowe | ................ | G06F 16/24564 |

OTHER PUBLICATIONS

Donut Multiples Chart Options, Looker Data Sciences, Inc., Published on Jun. 15, 2019.*

* cited by examiner

*Primary Examiner* — Mahelet Shiberou
(74) *Attorney, Agent, or Firm* — Buckley, Maschoff & Talwalkar LLC (57) ABSTRACT

Provided is a system and method which provides visually-compacted search results with attribute information embedded therein. In one example, the method may include receiving, via a user interface, a search request based on a set of attributes, identifying search results that match the search request based on attributes of the search results with respect to the set of attributes, and displaying, via the user interface, a plurality of circular objects corresponding to the plurality of search results, respectively, each circular object comprising a round-shaped outer bar arranged around an outer boundary of the circular object which includes attribute information of a search result corresponding to the circular object embedded therein.

20 Claims, 8 Drawing Sheets

Role: Technical Consultant

Start Date: Nov. 7, 2020

End Date: March 27, 2020

Required Hrs: 600 hours

Request Status: Open

Priority: High

LEGEND

+85% Match
+70% - 85% Match
+55% - 70% Match

COMPACT DISPLAY OF MATCHING RESULTS

BACKGROUND

Intelligent systems such as search engines receive search criteria and match certain objects (e.g., items, users, properties, services, etc.) based on the received search criteria. The search results may be output via a display screen. For example, a user may specify predefined criteria of interest to the user. This criteria may be used by the system to find the matching search results. For the results to be helpful, a user should be able to quickly understand the attributes of the results in order to compare the results with each other. For example, search results are typically displayed in a visual format that provides a textual description of the item including a name, a description, important features, a location, and other details. The more information that is provided, the more helpful for the user. However, the number of results and the detail of the information that can be displayed on a user interface is limited or must be implemented via different pages. These issues are further exacerbated on devices with small display screens such as tables, smart phones, smart-wearables, kiosks, and the like.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Search engines and other intelligent systems typically provide search results (matches) as text-based descriptions. The results may also include an image of the item, a detailed description, a hyperlink to a page, and the like, which enable a viewer to further drill into the search results. Text-based search results are typically provided as a vertical list with the text-attributes readable along a horizontal plane from left-to-right. Such a design takes up a significant amount of space on a display screen. As a result, it is common for only a few search results to be visible on a display screen, at once. In order for a user to view the unseen additional search results, the user must scroll down by tapping on the keyboard or manipulating a cursor with a mouse. Furthermore, when the additional search results are revealed, the previously visible search results are now hidden as they no longer fit on the screen.

The example embodiments are directed towards a new type of visualization for search results, also referred to herein as matching results. Furthermore, the example embodiments provide for new interactions with the search results not previously known in the art. Each search result may be displayed as a circular object that includes an interior area with information embedded therein such as an image of the item, a description of the item, a name, etc. In addition, each circular object may include a compact circular bar that is arranged on an outside boundary of the circular object. Attribute information can be embedded within the circular bar.

In some embodiments, the attribute information may include text, however, this is not a requirement. In other embodiments, the attribute information may be represented with colors, shadings, markings. etc. The attributes represented by the fragments may be defined by the user and may be part of the matching criteria used by the search engine to match the search results to the initial query.

For example, a user may input a search for restaurants (e.g., "find restaurants near me"). The user may specify matching criteria such as cost, geographic location, user review rating, and the like. The criteria (e.g., filters, etc.) may be applied by the search engine to all available searchable items to generate search results that best match the input criteria. In this example, the search results may provide a list of restaurants that most closely match the user's specified criteria. Inside each circular object may be an image of the restaurant, its logo, a predefined picture. etc. Meanwhile, arranged along an outer boundary of the circular object is a circular bar. Embedded within the circular bar may be multiple fragments (e.g., a fragment that represents cost, a fragment that represents location, and a fragment that represents rating). The fragments may include markers, indicators, or the like, which enable the user to easily understand which attributes most closely match their criteria.

For example, if the average cost of the restaurant is less than 85% of the other restaurants in the area, the cost attribute may be an 75% match. If the geographic location of the restaurant is closer than 91% of the other restaurants in the area, the geographic location attribute may be a 91% match. As another example, if the rating of the restaurant is better than 68% of other restaurants in the area, the rating attribute may be a 68% match. Different visual identifiers such as markings, colors, shadings, etc., may be used to initially represent the attributes instead of using a text-based description.

As one example, colored fragments may be used to show how closely each attribute matches the user's criteria. In this example, a green colored fragment may indicate a close match (e.g., above 80%), a yellow colored fragment may indicate a good match (e.g., between 70-80%), and a red colored fragment may indicate an average match (e.g., between 50-70%). Based on this color criteria, the fragment representing the cost attribute may be colored yellow, the fragment representing the geographic location attribute may be colored green, and the fragment representing the rating attribute may be colored red. A location of the fragments may be the same for each search result. For example, the cost attribute fragment may be in the top left, the geographic location attribute fragment may be in the top right, and the rating attribute fragment may be at the bottom of the circular bar. That is, the location may be predefined such that the user already knows which attributes/fragments are defined for each position in the circular bar.

In this example, the user does not need to read any text to understand which matching criteria a search result satisfied, and how closely the search result is to the matching criteria. Instead, the user can easily scan the images/colors of the fragments to grasp the results. Furthermore, a size of the circular objects may be significantly more compact (smaller) than traditional text-based search results. In some embodiments, the search results can be displayed along a horizontal list instead of a traditional vertical list. Furthermore, the search results are quickly comparable with each other because the user just needs to compare colors rather than read text-based attributes. If required, a full explanation of matching criteria of a search result can be provided to the user when the user clicks on a link or selects the circular object corresponding to the search result.

Figure 1:
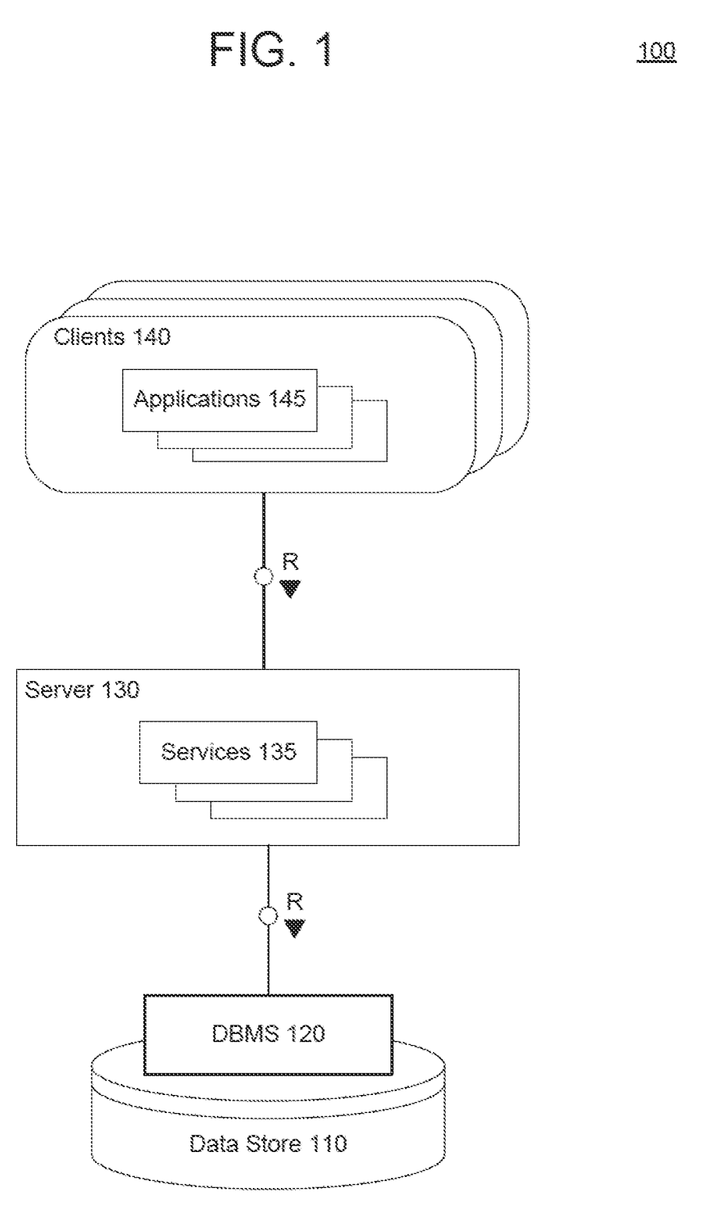
FIG. 1 is a diagram illustrating a database system architecture in accordance with an example embodiment.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis via a user interface displayed on the client 140 to view analytical information such as search results (matching results), charts, graphs, tables, and the like, based on the underlying data stored in the data store 110. For example, an application 145 may be a search engine that receives a user input via a search bar, or the like, returns a list of search results that are compacted according to example embodiments. The application 145 may pass analytic information to one of services 135 based on input received via the client 140. A structured query language (SQL) script may be generated based on the request and forwarded to DBMS 120. DBMS 120 may execute the SQL script to return a result set based on data of data store 110, and the application 145 creates a report/visualization based on the result set. As another example, the analytic data may be input by the user and provided directly from the application 145 to the DBMS 120 or the data store 110.

According to various embodiments, an application 145 and/or a service 135 may be used to execute a matching process and output visual matching results as described in the examples of FIGS. 2A-2B, and 3A-3C. The matching may be performed by a search engine or other software program that is implemented via one or more services 135, applications 145, and the like.

Raw data (e.g., documents, tables, training data, etc.) from various sources may be stored in the data store 110. In this example, the application 145 and/or the service 135 may extract core features from the raw data and also derive features from the core features. The features may be stored as database tables within the data store 110. For example, a feature may be assigned to its own table with one or more columns of data. In one example, the features may be observed as numerical values. Furthermore, the application 145 and/or the service 135 may merge or otherwise combine features based on a union or join function. In this example, the application 145 and/or the service 135 may combine features from a plurality of database tables into a single table which is then stored in the data store 110.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

Data (e.g., data records, data entries, documents, etc.) may be stored, modified, deleted, and the like, within the data store 110. As an example, data may be created, written, modified, or deleted based on instructions from any of the applications 145, the services 135, and the like. Each piece of data may be assigned a globally unique identifier (GUID) by an operating system, or other program of the database 100. The GUID is used to uniquely identify that data from among all other data stored within the database 100. GUIDs may be created in multiple ways including, but not limited to, random, time-based, hardware-based, content-based, a combination thereof, and the like.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTMEL format) from application server 130 via HTTP, HTTPS, and/or WebSocket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Figure 2A:
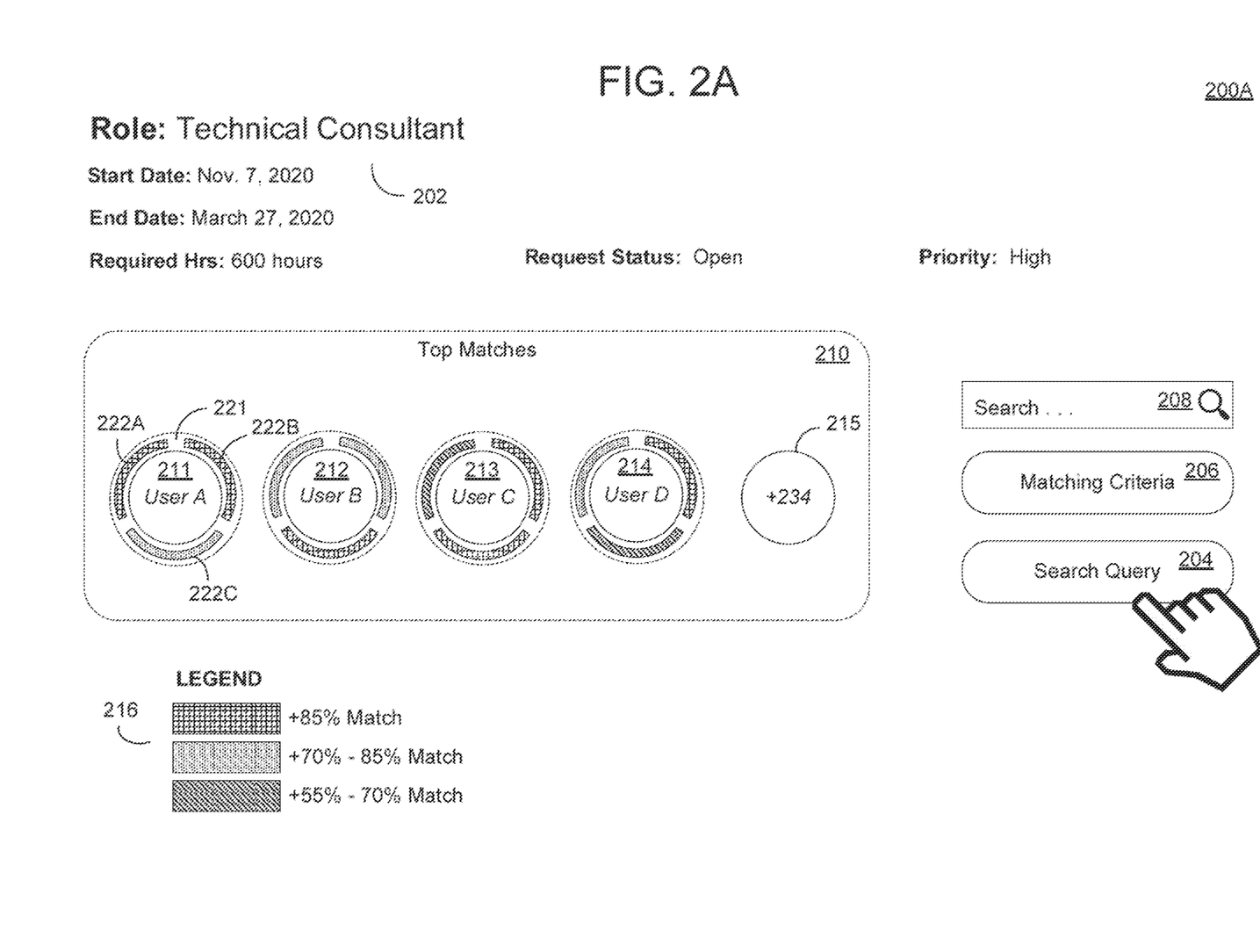
FIG. 2A is a diagram illustrating a user interface which includes compacted matching results in accordance with example embodiments.
Figure 2B:
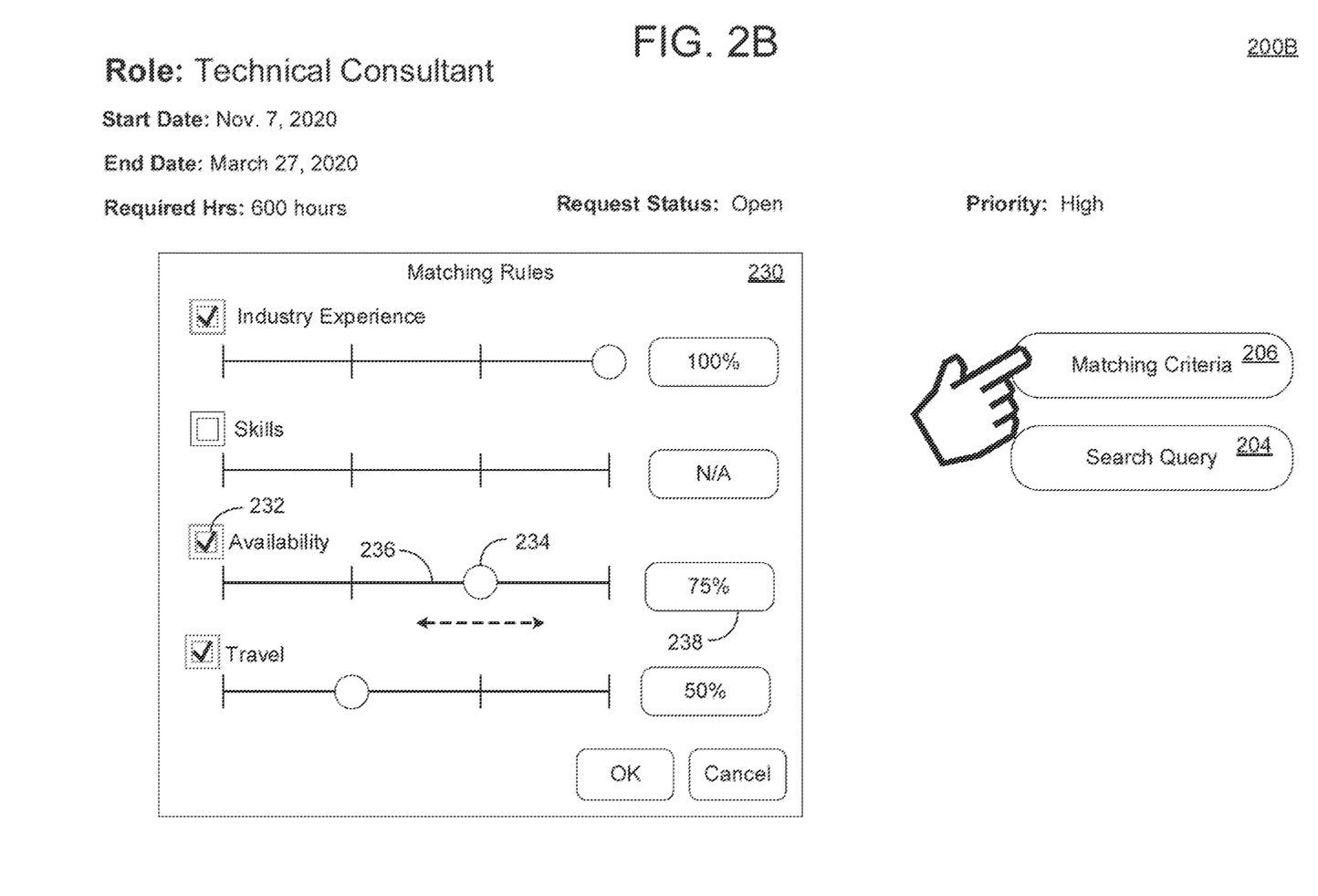
FIG. 2B is a diagram illustrating a window for modifying the matching criteria in accordance with example embodiments.
Figure 3A:
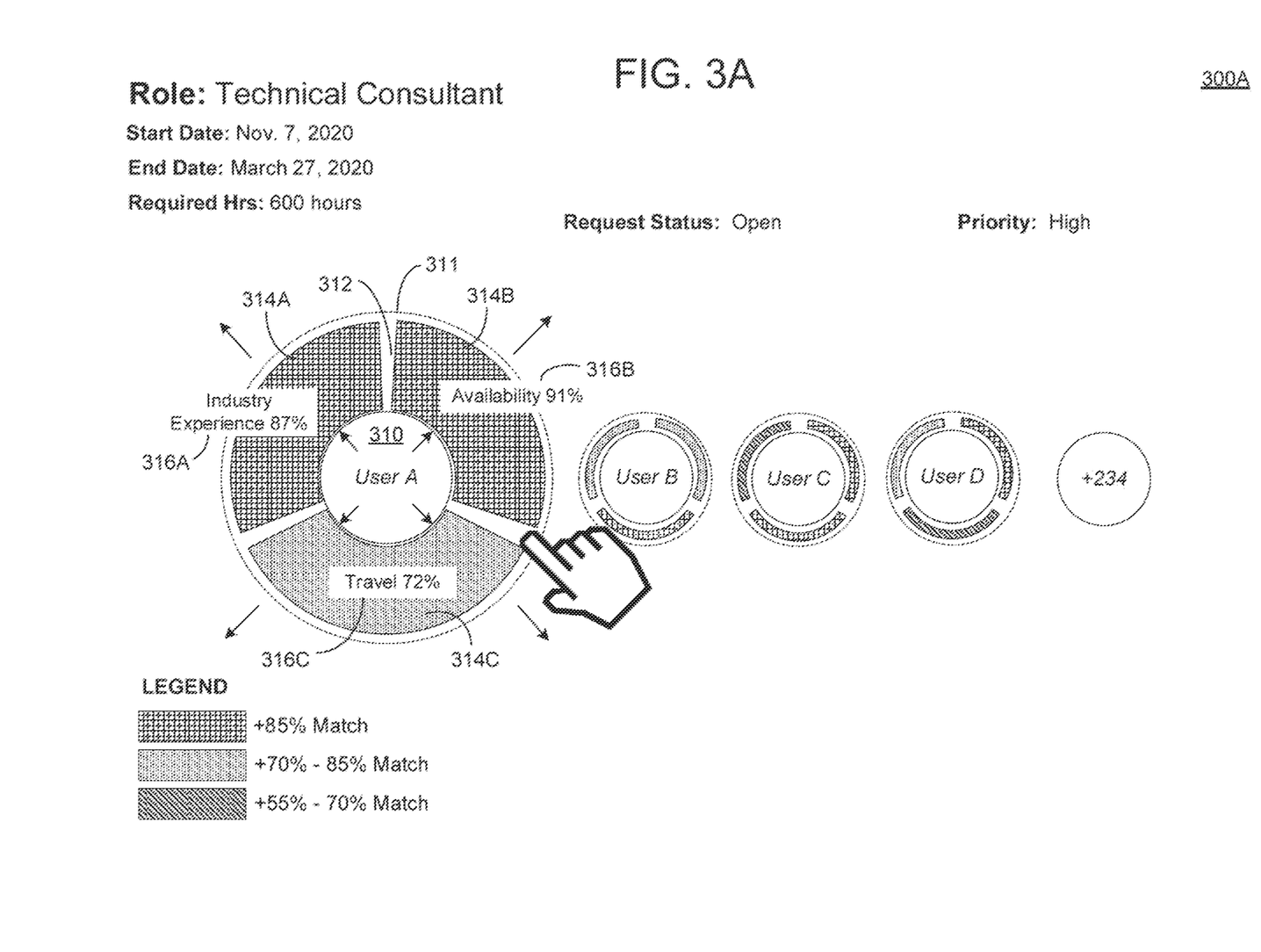
FIGS. 3A-3C is a diagrams illustrating interactions with the compacted matching results within the user interface in accordance with an example embodiment.

FIG. 2A illustrates a user interface 200A which includes compacted matching results in accordance with example embodiments. In the examples of FIGS. 2A, 2B, 3A. 3B, and 3C, the examples are directed to a process of searching for matching candidates (e.g., users) to fill a vacant employment opportunity. However, it should be appreciated that the example embodiments are not limited to searching for users or matching candidates to available job opportunities. Other examples include, but are not limited to, searching for products, hotel rooms, flights, web-based search engines, and the like.

Referring to FIG. 2A, the user interface 200A includes various details 202 about the available opportunity being searched including a title of the position, a start date, an end date, a priority, a status, and the like. The right-hand side of the user interface 200A provides a search bar 208 that allows a user to input words, phrases, alphanumeric characters, etc., and search for similar matches. The user may enter a search term or terms into the search bar 208 and press a submit button 204 (e.g., via a cursor, touch screen, etc.), which returns a set of search results as shown in the window 210. While this example shows a text-input based search bar 208, the available search terms may be predefined and selected from a list/menu. For example, predefined terms may identify a position type from among different position types (titles, names, etc.), and the user may select one from the predefined types.

The window 210 may be embedded within a template of the user interface 200A and not a separate window. As another option, the window 210 may be a separate window that pops-up after the search is input. The window 210 includes a plurality of search results which are represented by circular objects. Here, there are five circular object with the first four circular objects representing four user (user A, user B, user C, and user D) and the fifth circular object representing remaining search results that may selected to reveal additional search results. In this example, a first user (user A) corresponds to a first search result. Here, the search result includes a circular object that includes an interior region 211 which may include an image, description, etc., of the user, and a circular outer bar 221 that is circular-shaped and wraps around the interior region 211. Embedded within the circular outer bar 221 are a plurality of circular fragments 222A, 222B, and 222C which represent different attributes of the user which are used for as matching criteria for the identifying the matching results. Likewise, the other search results may include interior regions 212, 213, 214, and 215, respectively. The interior regions 211-214 may include displays of images of the items being searched while the interior region 215 of the fifth search result may be a number representing the amount of search results that are initially concealed from the display.

The circular object (i.e., the search result or matching result) in this example, includes both the interior region 211 and the circular outer bar 221. An outer boundary of the interior region 211 may be an inner boundary for the circular outer bar 221. However, in some embodiments, a gap or blank space may exist between the outer boundary of the interior region 211 and an inner boundary of the circular outer bar 221. In this example, the circular object does not include text, but it may include small fields of text. For example, a percentage (e.g., 85%) may be shown inside the circular fragments 222A, 222B, and 222C to provide a quick understanding of how close the search result matches the search criteria for a particular attribute of the matching criteria. As further described in the examples of FIGS. 3A-3C, the user may interact with the circular objects to expand, collapse, and drill-down into more information associated with the circular objects.

The circular objects (matching results) may be arranged along a horizontal axis. In this case, the circular objects may be arranged along a plane that is parallel to the plane in which the text is provided. By arranging the circular objects along a horizontal plane, the search results may be provided in the form of a row that runs from left to right on the screen. As another example, the circular objects may be provided in multiple horizontal rows. As another example, the circular objects may be provided in a vertical arrangement, although shown in a horizontal arrangement in FIG. 2A.

At the lower portion of the user interface 200A is a legend 216 that provides values for the different shadings that are used within the circular fragments 222A, 222B, and 222C. As will be appreciated, rather than using shading, the user interface may display the circular fragments in different colors, or the like. By using predefined locations for the attributes within the circular fragments, and using the same locations in each circular object, the user can easily compare the search results with each other. That is, the user can quickly compare the attribute values of the different search results by simply comparing the shadings, colors, etc. Thus, a user does not need to read text-based attributes to understand the content of the search results.

FIG. 2B illustrates a user interface 200B for modifying the matching criteria used for identifying the search results in the window 210 of FIG. 2A, in accordance with example embodiments. In particular, user interface 200B includes a window 230 with interactive elements (e.g., sliders, etc.) for modifying which attributes are used for matching search results, and how much weight is to be applied to each of the attributes with respect to the other attributes. For example, the user may launch, or pop-up, the window 230 or overlay the window 230 on top of the window 210 by clicking on an item in the user interface 200A such as a button 206, but embodiments are not limited thereto.

In this example, the window 230 includes a list of the attributes (e.g., experience, skills, availability, travel, etc.) that may be used to match search results. A user may select which attributes are to be used during the matching process and which attributes are to be included in the circular outer bar (e.g., circular outer bar 221 shown in FIG. 2A) that is displayed with all search results. Here, the user may select a checkbox 232, or the like, to select the attribute for inclusion in the matching process and to be represented by a circular fragment in the circular outer bar. As another example, two different checkboxes may be provided where a first checkbox allows the user to select the attribute for inclusion in the outer circular bar and a second checkbox allows the user to select the attribute for use in the matching process. In addition, the user may also move a slider 234 (e.g., via a mouse, cursor, touch input, etc.) along an axis 236 to control a weight 238 that is given to an attribute by a search engine during the matching process. Thus, a user can dynamically adjust, change, update, modify, etc., one or more of the attributes that are represented by the circular fragments, the attributes that are used to perform the matching process, and the weight that is given to the attributes.

FIG. 3A illustrates a user interface 300A in which a user selects a first circular object corresponding to user A from among the circular objects in the search results. In this example, the first circular object includes an interior portion 310 which may be an image of the item (e.g., user A) who constitutes the search result. The first circular object also includes a circular outer bar 312 that exists outside of the interior portion 310. To select the circular object the user may move the cursor over (e.g., hover over) the circular object or move the cursor within a vicinity of the circular object. For example, when the cursor crosses over an outer boundary 311 of a circular outer bar 312, the size of the circular object may expand. As another example, the user may click on (e.g., with a pointer, mouse, finger, etc.) an portion of the circular object. As another example, the user may type in a command via a keyboard or a spoken command via a microphone.

In the example of FIG. 3A, the interior portion 310 and the circular outer bar 312 both expand, but at different rates. The circular outer bar 312 represents the visual space between an outer boundary of the interior portion 310 and an outer boundary 311 (dashed line) that encircles the circular object. Embedded within the circular outer bar 312 are a plurality of circular fragments 314A, 314B, and 314C that correspond to three different attributes used in the matching. The circular outer bar 312 and circular fragments 314A, 314B, and 314C embedded inside of the circular outer bar 312, may expand at a greater rate than the interior portion 310. In this case, the interior portion 310 increases in size by about 50% while the circular outer bar 312 and the circular fragments 314A, 314B, and 314C increase in size by about 300%. It should also be appreciated that the interior portion 310 may not expand at all when selected, but may remain the same size or decrease in size.

When the circular fragments 314A, 314B, and 314C expand, additional information that is previously not displayed may be displayed. For example, attribute information 316A, 316B, and 316C may be revealed by the expansion of the circular fragments 314A, 314B, and 314C, respectively. In this case, the revealed attribute information includes a text description (identifier) of the attribute and a matching percentage of the attribute associated with the search result. The attribute information 316A, 316B, and 316C may include text content such as a short description of the attribute, its value, etc. In this example, the text may run along the same horizontal plane on which the search results are displayed. The attribute information 316A, 316B, and 316C may be enclosed inside of the circular fragments 314A, 314B, and 314C. However, in this example, the attribute information 316A, 316B, and 316C is not limited to the boundaries of the circular fragments 314A, 314B, and 314C, and may be displayed outside or partially outside the boundaries of the circular fragments 314A, 314B, and 314C. Furthermore, the attribute information 316A, 316B, and 316C, may be displayed at the same position within the circular fragments 314A, 314B, and 314C, respectively, or they may be displayed at different respective positions as is the case in FIG. 3A.

Figure 3B:
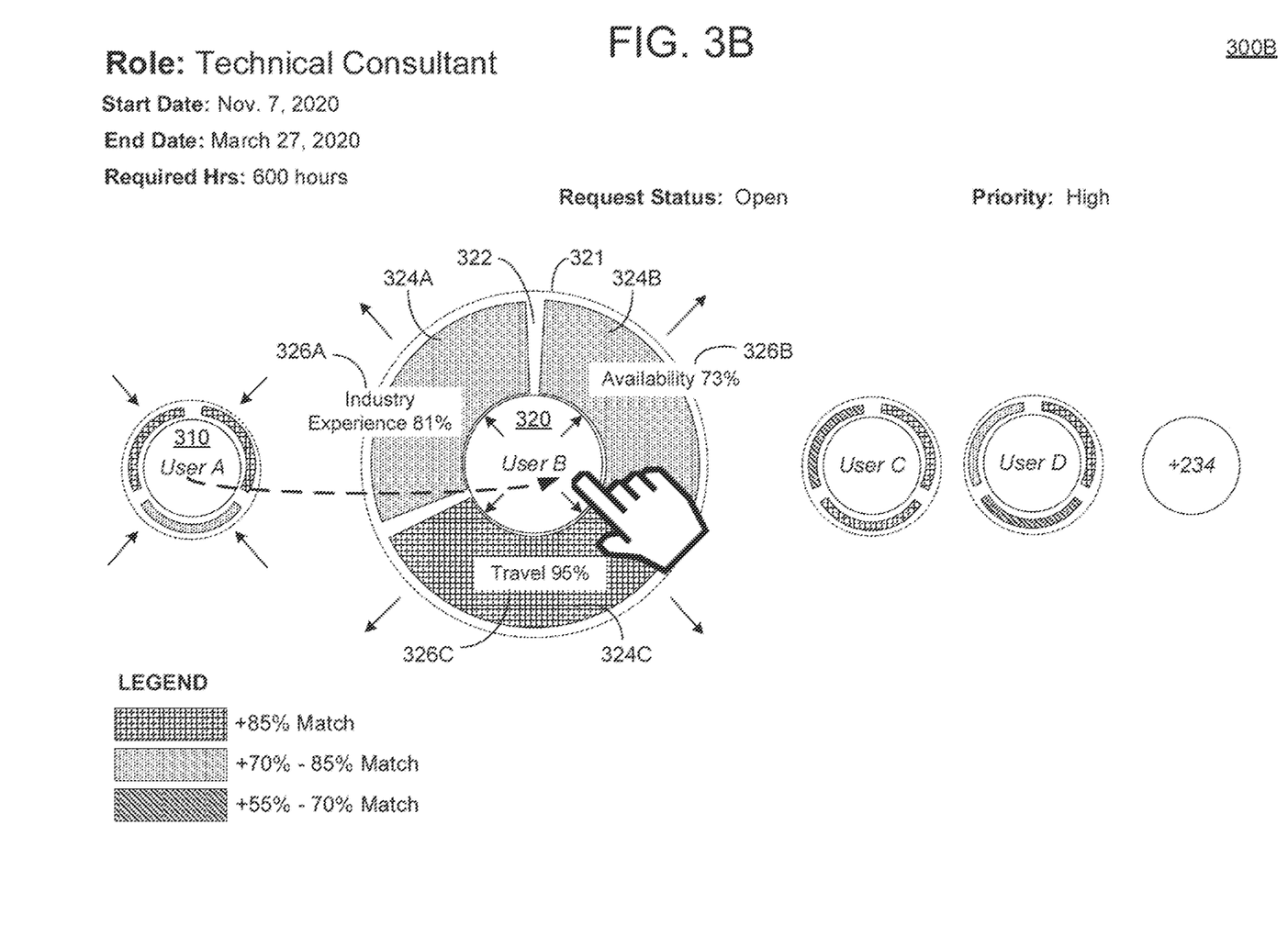

The user may move the cursor from the first circular object (user A) to the second circular object (user B) as shown in FIG. 3B. In response, the display may collapse the first circular object once the cursor has been moved outside the boundary of the first circular object, or the like, and may expand the second circular object upon the cursor crossing over an outer boundary 321 of an outer circular bar 322 of the second search result (second circular object) devoted to user B. In response, the display may expand an interior portion 320 and the outer circular bar 322 including circular fragments 324A, 324B, and 324C embedded within the outer circular bar 322. Likewise, attribute information 326A, 326B, and 326C may be revealed by the expansion of the circular fragments 324A, 324B, and 324C, respectively.

In some embodiments, the circular objects may remain static (in place) on the screen. In some embodiments, however, one or more circular objects may be moved to make room for an expanded circular object. In the example of FIG. 3B, the first circular object (user A) and the third, fourth, and fifth circular objects (user C, user D, and extra results) may be moved outward from the selected second circular object (user B) to make room for the expanded size of the second circular object.

Figure 3C:
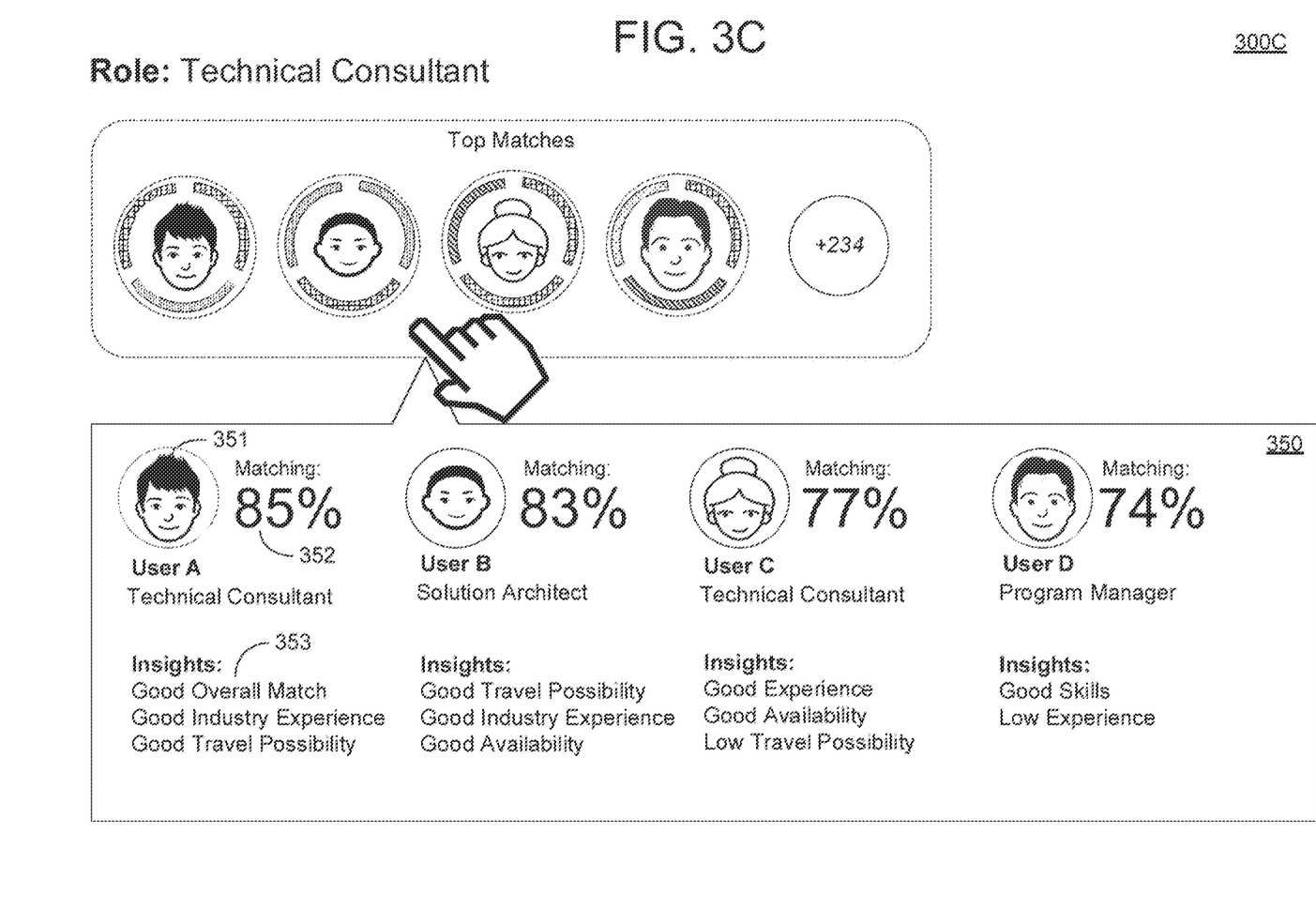

FIG. 3C illustrates an interactive example in which the user drills down into more details about the search results within the circular objects. In the example of FIG. 3C, images (pictures) of the users are shown inside the interior areas of the search results. Here, the pictures and the circular segments, colored icons, are much quicker to recognize with a quick scan and to differentiate the attribute values in comparison to text-based attributes. In this example, the user may click on a button, a predetermined area, or simply perform a special command (e.g., double click, certain key press, certain vocal command, etc.) causing an additional window 350 to be displayed which is offset from the original search results window. Here, the additional window 350 includes additional details 351, 352, and 353 about each of the search results (user A, user B, user C, and user D). For example, the additional details may include a bigger image 351, a matching value 352, and key insights 353 which may describe unique attributes of the particular search result with respect to the other search results. Thus, the user can view additional information about the search results in text if the user so desires.

Figure 4:
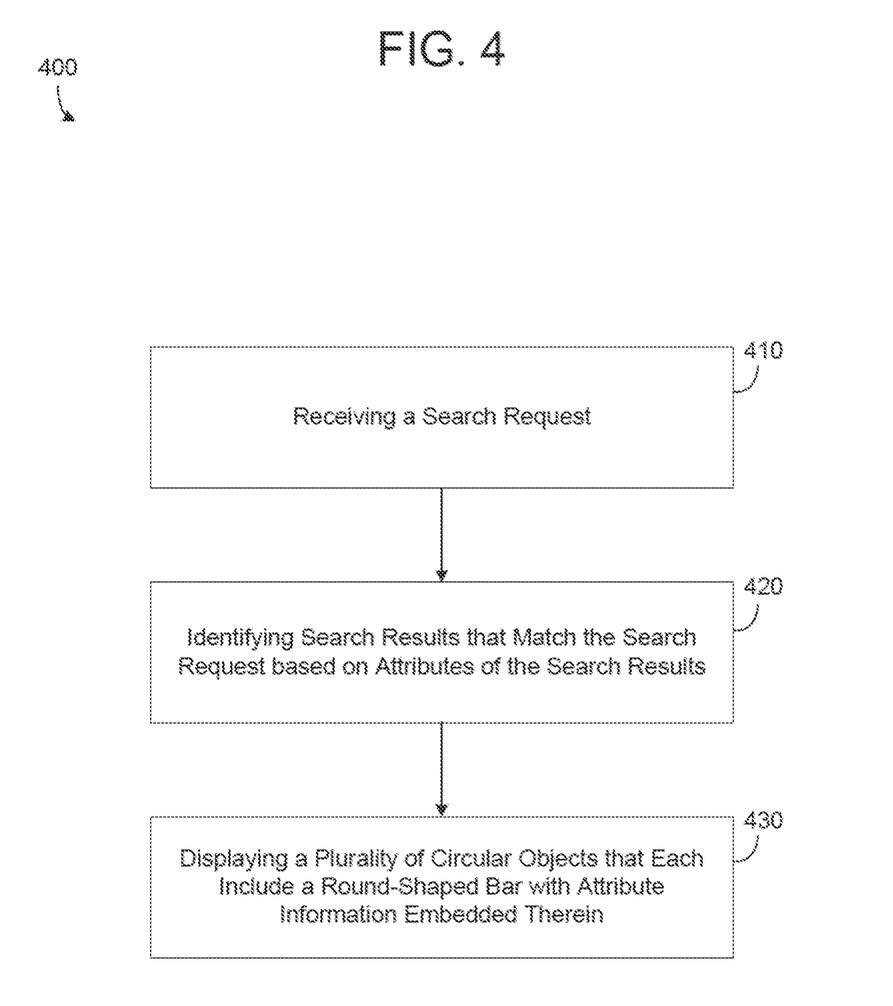
FIG. 4 is a diagram illustrating a method of displaying compacted matching results in accordance with an example embodiment.

FIG. 4 illustrates a method 400 a method of displaying compacted matching results in accordance with an example embodiment. For example, the method 400 may be performed by a database node, a cloud platform, a server, a computing system (user device), a combination of devices/nodes, or the like. Referring to FIG. 4, in 410, the method may include receiving, via a user interface, a search request based on a set of attributes. For example, the search request may include a text input (e.g., letters, words, numbers, phrases, sentences, alphanumeric characters, etc.) which are input via a keyboards. As another example, the search request may comprise a spoken input captured via a microphone, a gesture captured via a camera, and the like.

In 420, the method may include identifying search results that match the search request based on attributes of the search results with respect to the set of attributes. Here, the matching may be performed based on matching rules which specify how much weight to apply to different attributes of the item being searched. Attributes may include qualities, characteristics, features, functions, etc., of the item being searched. The matching rules may specify how much weight to apply to each attribute.

In 430, the method may include displaying, via the user interface, a plurality of circular objects corresponding to the plurality of search results, respectively, each circular object comprising a round-shaped outer bar arranged around an outer boundary of the circular object which includes attribute information of a search result corresponding to the circular object embedded therein. The round shaped outer bar may include a circle, a partial circle, circular segments with gaps in-between, etc. In other words, the round-shaped outer bar may be a continuous bar or it may be broken up by blank spaces, gaps, etc. where nothing but blank screen is between different portions of the round-shaped outer bar.

In some embodiments, the displaying may include displaying a plurality of round-shaped fragments inside a round-shaped outer bar of a circular object, where the plurality of round-shaped fragments include information about a plurality of respective attributes of a corresponding search result embedded therein. The blank spaces may exist between each of the fragments which enables a viewer to easily recognize the existence of the fragments even though they may be compact in size. The round shaped fragments may represent matching characteristics of attributes of the item. For example, a first fragment may represent a first attribute used in the matching process. A color, size, shape, shading, etc. of the fragment in its compacted view may be used to provide additional information (e.g., a degree of matching). For example, a green color may indicate a very high match, a yellow color may indicate an average match, and a red color may indicate a below average match.

In some embodiments, the method may further include, in response to a selection of a circular object, expanding a round-shaped outer bar of the selected circular object and revealing additional attribute information of a search result corresponding to the selected circular object within the expanded round-shaped outer bar. In some embodiments, the displaying comprises displaying an image of a respective search result within an interior of each respective circular object. In some embodiments, the method may further include, in response to selection via the user interface, opening a window that includes additional attribute information of one or more search results corresponding to one or more of the selected circular objects.

In some embodiments, the displaying may include displaying two round-shaped fragments inside the round-shaped outer bar in different colors based on respective attribute information represented by the two round-shaped fragments. In some embodiments, the method may further include dynamically modifying attribute information within the round-shaped outer bars arranged around the outer boundaries of the circular objects in response to an input entered via the user interface. In some embodiments, the displaying may include arranging the plurality of circular objects in a horizontal row within the user interface.

Figure 5:
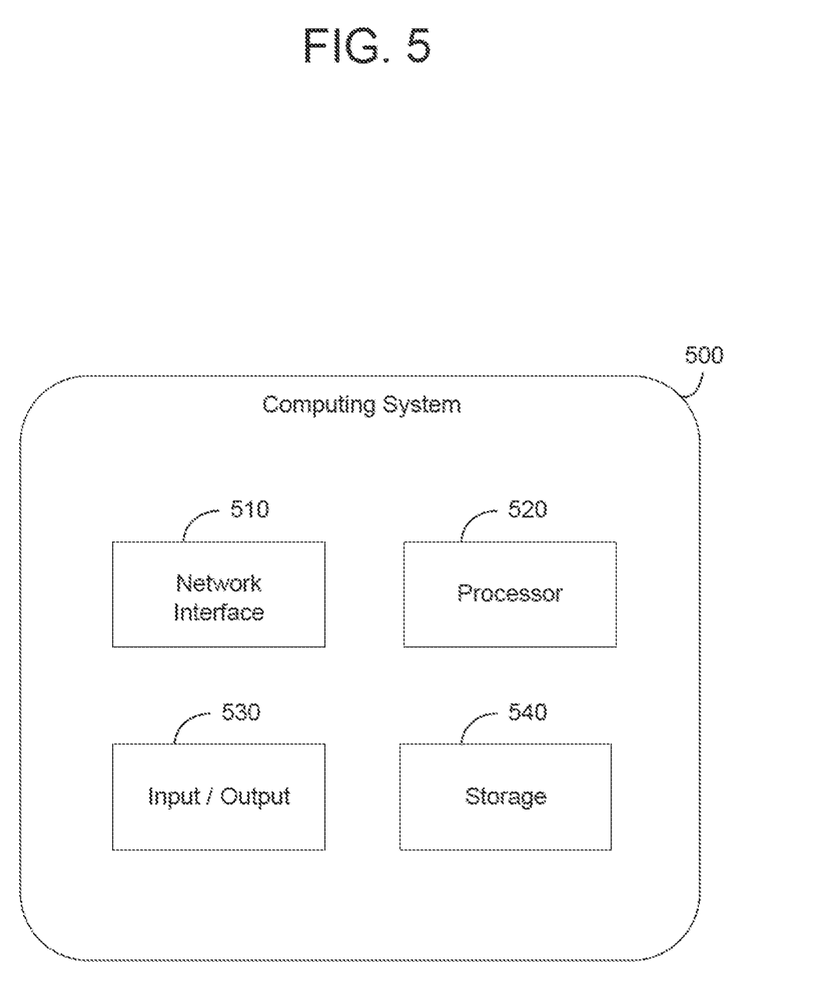
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/ output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store having a plurality of tables, records, partitions and sub-partitions. The storage 540 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory configured to store instructions for displaying a user interface; and
a processor configured to
receive, via the user interface, a search request based on a set of attributes,
identify search results that match the search request based on attributes of the search results with respect to the set of attributes of the search request,
display a plurality of circular objects corresponding to the plurality of search results together along a horizontal axis within the user interface, respectively, each circular object comprising a round-shaped outer bar arranged around an outer boundary of the circular object and a plurality of round-shaped fragments embedded within the round-shaped outer bar corresponding to a plurality of different attributes used to match a respective search result to the search request, and
receive a selection of a circular object from among the plurality of circular objects via the user interface, and in response, expand a size of a round-shaped outer bar of the selected circular object and expand sizes of a plurality of round-shaped fragments which are positioned between an interior of the selected circular object and an outer boundary of the round-shaped outer bar of the selected circular object while the selected circulator object remains along the horizontal axis within the user interface.

2. The computing system of claim 1, wherein the processor is further configured to collapse the size of the round-shaped outer bar and the sizes of the plurality of round-shaped fragments in response to detecting deselection of the selected circular object via the user interface.

3. The computing system of claim 1, wherein the processor is further configured to expand an image of a respective search result within the interior of the selected circular object at a rate of expansion that is less than a rate of expansion at which the round-shaped outer bar is expanded.

4. The computing system of claim 1, wherein the processor is further configured to, in response to selection via the user interface, open a window that includes additional attribute information of one or more search results corresponding to one or more of the selected circular objects.

5. The computing system of claim 1, wherein the processor is configured to display names of the plurality of different attributes within the plurality of round-shaped fragments and percentage values indicating how closely the plurality of different attributes match the set of attributes of the search request.

6. The computing system of claim 5, wherein the processor is further configured to display two round-shaped fragments inside the round-shaped outer bar in different colors based on respective attribute information represented by the two round-shaped fragments.

7. The computing system of claim 1, wherein the processor is further configured to dynamically modify attribute information within the round-shaped outer bars arranged around the outer boundaries of the circular objects in response to an input entered via the user interface.

8. The computing system of claim 1, wherein the processor is further configured to display a number that is positioned along the horizontal axis with the plurality of circular objects within the user interface, wherein the number identifies a number of search results not currently shown.

9. A method comprising:
receiving, via a user interface, a search request based on a set of attributes;

identifying search results that match the search request based on attributes of the search results with respect to the set of attributes of the search request;

displaying a plurality of circular objects corresponding to the plurality of search results together along a horizontal axis within the user interface, respectively, each circular object comprising a round-shaped outer bar arranged around an outer boundary of the circular object and a plurality of round-shaped fragments embedded within the round-shaped outer bar corresponding to a plurality of different attributes used to match a respective search result to the search request; and receiving a selection of a circular object from among the plurality of circular objects via the user interface, and in response, expanding a size of a round-shaped outer bar of the selected circular object and expanding sizes of a plurality of round-shaped fragments which are positioned between an interior of the selected circular object and an outer boundary of the round-shaped outer bar of the selected circular object while the selected circulator object remains along the horizontal axis within the user interface.

10. The method of claim 9, further comprising collapsing the size of the round-shaped outer bar and the sizes of the plurality of round-shaped fragments in response to detecting deselection of the selected circular object via the user interface.

11. The method of claim 9, wherein the displaying comprises expanding an image of a respective search result within the interior of the selected circular object at a rate of expansion that is less than a rate of expansion at which the round-shaped outer bar is expanded.

12. The method of claim 9, further comprising, in response to selection via the user interface, opening a window that includes additional attribute information of one or more search results corresponding to one or more of the selected circular objects.

13. The method of claim 9, wherein the displaying comprises displaying names of the plurality of different attributes within the plurality of round-shaped fragments and percentage values indicating how closely the plurality of different attributes match the set of attributes of the search request.

14. The method of claim 13, wherein the displaying comprises displaying two round-shaped fragments inside the round-shaped outer bar in different colors based on respective attribute information represented by the two round-shaped fragments.

15. The method of claim 9, further comprising dynamically modifying attribute information within the round-shaped outer bars arranged around the outer boundaries of the circular objects in response to an input entered via the user interface.

16. The method of claim 9, wherein the displaying comprises a number that is positioned along the horizontal axis with the plurality of circular objects within the user interface, wherein the number identifies a number of search results not currently shown.

17. A non-transitory computer-readable medium comprising instructions which when executed by a processor cause a computer to perform a method comprising:

receiving, via a user interface, a search request based on a set of attributes;

identifying search results that match the search request based on attributes of the search results with respect to the set of attributes of the search request;

displaying a plurality of circular objects corresponding to the plurality of search results together along a horizontal axis within the user interface, respectively, each circular object comprising a round-shaped outer bar arranged around an outer boundary of the circular object and a plurality of round-shaped fragments embedded within the round-shaped outer bar corresponding to a plurality of different attributes used to match a respective search result to the search request; and receiving a selection of a circular object from among the plurality of circular objects via the user interface, and in response, expanding a size of a round-shaped outer bar of the selected circular object and expanding sizes of a plurality of round-shaped fragments which are positioned between an interior of the selected circular object and an outer boundary of the round-shaped outer bar of the selected circular object while the selected circulator object remains along the horizontal axis within the user interface.

18. The non-transitory computer-readable medium of claim 17, wherein the method further comprises collapsing the size of the round-shaped outer bar and the sizes of the plurality of round-shaped fragments in response to detecting deselection of the selected circular object via the user interface.

19. The non-transitory computer-readable medium of claim 17, wherein the displaying comprises expanding an image of a respective search result within the interior of the selected circular object at a rate of expansion that is less than a rate of expansion at which the round-shaped outer bar is expanded.

20. The non-transitory computer-readable medium of claim 17, wherein the method further comprises, in response to selection via the user interface, opening a window that includes additional attribute information of one or more search results corresponding to one or more of the selected circular objects.

\* \* \* \* \*